(12) United States Patent
Hsieh et al.

(10) Patent No.: US 7,967,667 B2
(45) Date of Patent: Jun. 28, 2011

(54) AUTOMATIC APPARATUS AND PROCESS FOR SHEDDING SUPERFICIAL ADHERENT SUBSTANCES OFF CREATURE

(75) Inventors: Chin-Chang Hsieh, Taipei (TW); Ming-Chiu Hsu, Taipei (TW)

(73) Assignee: Tianyuan Top Quality Industrial Co., Ltd., Taoyuan (TW)

( * ) Notice: Subject to any disclaimer, the term of this patent is extended or adjusted under 35 U.S.C. 154(b) by 377 days.

(21) Appl. No.: 12/330,953

(22) Filed: Dec. 9, 2008

(65) Prior Publication Data

US 2009/0233533 A1  Sep. 17, 2009

(30) Foreign Application Priority Data

Mar. 12, 2008 (TW) ............................... 97108713 A
Sep. 5, 2008 (TW) ............................... 97134178 A

(51) Int. Cl.
*A22C 25/02* (2006.01)
(52) U.S. Cl. ......................................................... 452/99
(58) Field of Classification Search .................. 452/98, 452/99, 101, 81, 105, 125
See application file for complete search history.

(56) References Cited

U.S. PATENT DOCUMENTS

| | | | | |
|---|---|---|---|---|
| 4,726,095 A | * | 2/1988 | Bissell et al. | 452/98 |
| 4,951,355 A | * | 8/1990 | Pack | 452/71 |
| 4,951,356 A | * | 8/1990 | Delplanque | 452/14 |
| 5,129,855 A | * | 7/1992 | Bruckert et al. | 452/99 |
| 6,210,262 B1 | * | 4/2001 | Burch et al. | 452/99 |
| 6,368,203 B1 | * | 4/2002 | Puretz | 452/81 |
| 6,508,699 B1 | * | 1/2003 | Santoriello et al. | 452/99 |
| 7,037,185 B1 | * | 5/2006 | Spence | 452/99 |
| 7,179,162 B1 | * | 2/2007 | Twiner | 452/105 |
| 7,390,249 B2 | * | 6/2008 | Sorey | 452/195 |

* cited by examiner

*Primary Examiner* — Thomas Price

(57) ABSTRACT

An automatic apparatus includes an input platform, a creature shaking mechanism, a flushing unit and an output platform. The input platform has a transporting unit. A creature container containing at least one creature is placed on the input platform. The creature shaking mechanism is connected to the input platform. When the creature container is transported to a positioning region of the creature shaking mechanism, the creature container is subject to a shaking operation in response to a power source, thereby turning over the creature and exposing different surfaces of the at least one creature. The flushing unit generates a spout of water to flush the different surfaces of the at least one creature so as to sufficiently shed superficial adherent substances off the at least one creature. The output platform is connected to the creature shaking mechanism for receiving the creature container that is departed from the positioning region.

23 Claims, 15 Drawing Sheets

AUTOMATIC APPARATUS AND PROCESS FOR SHEDDING SUPERFICIAL ADHERENT SUBSTANCES OFF CREATURE

CROSS-REFERENCE TO RELATED APPLICATION

This application claims priority under 35 U.S.C. §119 to Taiwan Patent Application No. 097108713, filed on Mar. 12, 2008, and Taiwan Patent Application No. 097134178, filed on Sep. 5, 2008, in the Taiwan Intellectual Property Office, the entire contents of which are hereby incorporated by reference.

FIELD OF THE INVENTION

The present invention relates to an automatic apparatus and an automatic process for shedding superficial adherent substances off an object, and more particularly to an automatic apparatus and an automatic process for shedding superficial adherent substances off at least one creature.

BACKGROUND OF THE INVENTION

In the fields of food-processing and aquatic products and fishery industry, it is a continuous research issue to develop and improve a rapid and automatic way for shedding superficial adherent substances off creatures (e.g. fishes).

Taking conventional automatic apparatus and process for shedding fish scales as an example. After a fish is manually clamped, the fish scales are automatically or semi-automatically shed off the fish by a scraper set of the automatic apparatus. The same procedure is repeated until the fish scales of all fishes are shed off. In addition, another conventional automatic apparatus employs a flushing unit comprising a water source, a pressurizing motor and many high-pressure water pipes instead of the scraper set. The high-pressure spout of water generated by the pressurizing motor is employed to shed the fish scales off the clamped fishes one by one.

Moreover, the above mentioned apparatus may further comprise a channel with a conveyor belt for transporting the fishes into the channel one by one. Afterwards, the fish scales are automatically shed off the fishes so as to reduce the time period of processing the fishes.

The above techniques, however, still have some drawbacks. For example, since the procedure of shedding the fish scales should be performed on a single fishes in a clamped status or in the channel for each time, the processing speed is restricted. In addition, the conventional automatic apparatus and process fail to simultaneously shed the fish scales off multiple fishes and thus the throughput is usually insufficient.

SUMMARY OF THE INVENTION

An object of the present invention provides an automatic apparatus and an automatic process for turning over a creature and exposing different surfaces of the creature, thereby shedding the superficial adherent substances off the creature.

Another object of the present invention provides an automatic apparatus and an automatic process for simultaneously shedding the superficial adherent substances off multiple creatures.

In accordance with an aspect of the present invention, there is provided an automatic apparatus for shedding superficial adherent substances off at least one creature. The automatic apparatus includes an input platform, a creature shaking mechanism, a flushing unit and an output platform. The input platform has a transporting unit. A creature container containing the at least one creature having a plurality of superficial adherent substances thereon is placed on the input platform. The creature container is transported by the transporting unit. The creature shaking mechanism has an input end connected to the input platform. When the creature container is transported by the transporting unit to a positioning region of the creature shaking mechanism, and the creature container is subject to a shaking operation in response to a power source, thereby turning over the creature and exposing different surfaces of the at least one creature. The flushing unit is disposed at one side of the positioning region for performing a flushing operation on the creature container and generating a spout of water to flush the different surfaces of the at least one creature so as to sufficiently shed the superficial adherent substances off the at least one creature. The output platform is connected to an output end of the creature shaking mechanism for receiving the creature container that is departed from the positioning region.

In an embodiment, the superficial adherent substances are grown on the surfaces of the creature.

In an embodiment, said creature is a fish and the superficial adherent substances are fish scales.

In an embodiment, the at least one creature contained in the creature container includes multiple creatures, wherein the creature container is subject to said shaking operation in response to the power source so as to turn over said multiple creatures and rub the multiple creatures against each other, thereby facilitating shedding the superficial adherent substances off the multiple creatures.

In an embodiment, the input platform is a stationary frame, the transporting unit includes an electric push rod electrically connected to the power source, and one side of the creature container that is placed on the stationary frame is pushed forwardly by the electric push rod to the positioning region of the creature shaking mechanism.

In an embodiment, the creature shaking mechanism includes a hollow-grid type structure and a shaking member, the shaking member being electrically connected to the power source.

In an embodiment, the positioning region is disposed at the middle of the open frame, and the creature shaking mechanism further includes two sets of stationary partition plates and two sets of movable partition plates. The two sets of stationary partition plates are disposed on left and right sides of the open frame and arranged in a direction parallel with a transporting direction of the creature container. The two sets of movable partition plates are disposed on front and rear sides of the open frame, arranged in a direction perpendicular to the transporting direction of the creature container, and selectively uplifted or descended. During the shaking operation of the creature container is performed, the movable partition plates are uplifted to confine the creature container and prevent departure of the creature container from the positioning region.

In an embodiment, the creature shaking mechanism further comprises a wire cage, which is supported on upper edges of the stationary partition plates, for preventing detachment of the creature during the shaking operation of the creature container is performed.

In an embodiment, the shaking member includes several pivot shafts, several pivot slices and several pivot holes, which are arranged and connected between the power source and the open frame.

In an embodiment, the power source includes a driving motor and a rotatable wobble disk electrically connected with the driving motor, and the rotatable wobble disk is pivotally coupled to a main pivot shaft of the pivot shafts.

In an embodiment, the power source comprises a pump and a pneumatic driving device connected with the pump, and the pneumatic driving device is pivotally coupled to a main pivot shaft of said pivot shafts.

In an embodiment, the creature shaking mechanism further includes an exhaust structure and a water baffle. The exhaust structure is disposed under the open frame for collecting or exhausting the superficial adherent substances and/or the spout of water flushing the at least one creature during the flushing operation is performed. The water baffle is arranged between the power source and the positioning region for isolating the power source from the positioning region, so that a short circuit of the power source caused by the spout of water during the flushing operation is performed is avoided.

In an embodiment, the exhaust structure comprises a drain tank and a drain pipe.

In an embodiment, the flushing unit includes a water source, a pressurizing motor and at least one flushing pipe, and the spout of water generated by the pressurizing motor is a high-pressure spout of water that flushes the at least one creature in either a fixed direction or a non-fixed direction.

In an embodiment, the creature container is a closed cavity with a cover for preventing the at least one creature from dropping out of the creature container during the shaking operation; and alternatively the creature container is an open cavity.

In an embodiment, the creature container has at least one hole for the at least one flushing pipe to pierce through when the creature container is a closed cavity with a cover; and alternatively the at least one flushing pipe is above said creature container when said creature container is an open cavity.

In an embodiment, the shaking operation includes one or more actions selected from an upward/downward reciprocated vibrating action, a forward/backward moving action, a leftward/rightward moving action, a turning-over action, a rotating action and a combination thereof.

In an embodiment, the output platform is a horizontal stationary frame and includes an additional transporting unit. The transporting unit is electrically connected to the power source for completely departing the creature container from the positioning region.

In an embodiment, the additional transporting unit includes an additional electric push rod electrically connected to the power source, and another side of the creature container is pulled by the additional electric push rod.

In an embodiment, the power source includes several solenoid valves for driving and controlling the transporting unit of the input platform, one of the movable partition plates of the creature shaking mechanism and the additional transporting unit of the output platform.

In an embodiment, the output platform is an inclined stationary frame having a slant surface, and the creature container slides along the slant surface such that the creature container is completely departed from the positioning region.

In an embodiment, each of the transporting unit of the input platform and the additional transporting unit of the output platform includes a belt-type roller assembly having a conveyor belt and a roller set.

In accordance with another aspect of the present invention, there is provided an automatic process for shedding superficial adherent substances off at least one creature. Firstly, a power source is provided. Next, an input platform having a first transporting unit is provided, wherein the input platform is connected to an input end of a creature shaking mechanism, and the first transporting unit is electrically connected to the power source. Multiple creature containers are successively and intermittently placed on the input platform. Next, the first transporting unit is driven to automatically and successively transport the creature containers to a positioning region of the creature shaking mechanism, wherein each of the creature containers contains the at least one creature having a plurality of superficial adherent substances thereon. Next, a shaking operation is performed on the creature containers that are transported to the positioning region by the creature shaking mechanism in response to the power source, so that the at least one creature is turned over to expose different surfaces of the at least one creature. A flushing unit is provided at a side of the positioning region for performing a flushing operation to generate a spout of water to flush the different surfaces of the creature so as to sufficiently shed the superficial adherent substances of the at least one creature. Next, an output platform having a second transporting unit is provided, wherein the output platform is connected to an output end of the creature shaking mechanism, and the second transporting unit is electrically connected to the power source. A next creature container is transported to the positioning region by the first transporting unit to push forward a previous creature container that has been subject to the shaking operation and the flushing operation. Afterwards, the second transporting unit is driven to transport the previous creature container to be departed from the positioning region and completely moved to the output platform.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 4C is a schematic perspective view illustrating the internal components of the creature shaking mechanism shown in FIG. 1, in which a water baffle is dispensed with;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

In this context, the superficial adherent substances are grown on the surfaces of the creatures. The present invention will be illustrated by referring fishes and fish scales as the creatures and the superficial adherent substances, respectively. Nevertheless, the automatic apparatus and the automatic process of the present invention can also be applied to shed mucosa off eels. Moreover, other creature characteristics of fish such as species, size, appearance and weight can be taken into consideration.

Figure 1A:
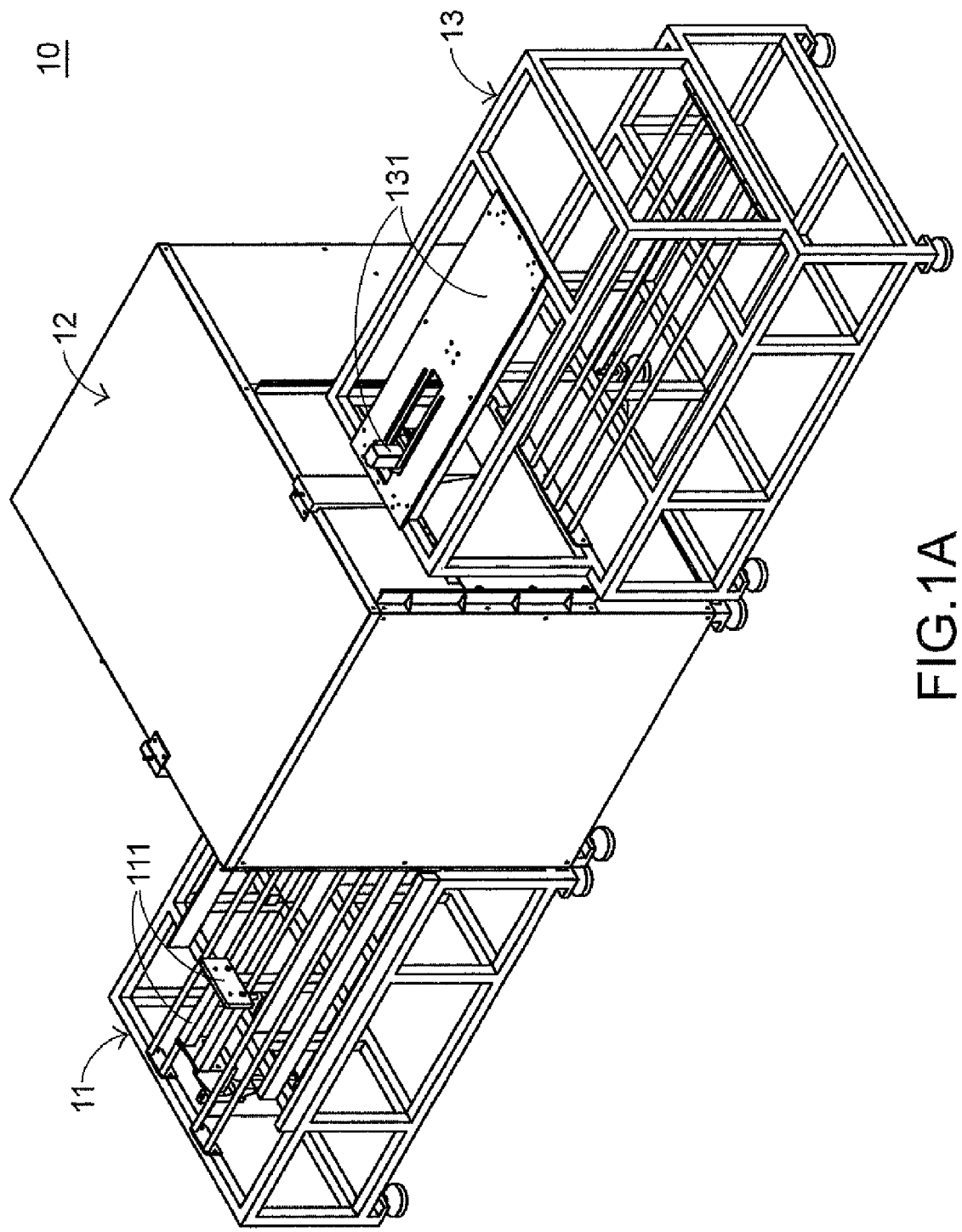
FIG. 1A is a schematic perspective view illustrating an automatic apparatus for shedding superficial adherent substances off at least one creature according to a first preferred embodiment of the present invention.

FIG. 1A is a schematic perspective view illustrating an automatic apparatus for shedding superficial adherent substances off at least one creature according to a first preferred embodiment of the present invention. As shown in FIG. 1A, the automatic apparatus 10 principally comprises an input platform 11, a creature shaking mechanism 12 and an output platform 13. The input platform 11 has a first transporting unit 111 and the output platform 13 has a second transporting unit 131.

Figure 1B:
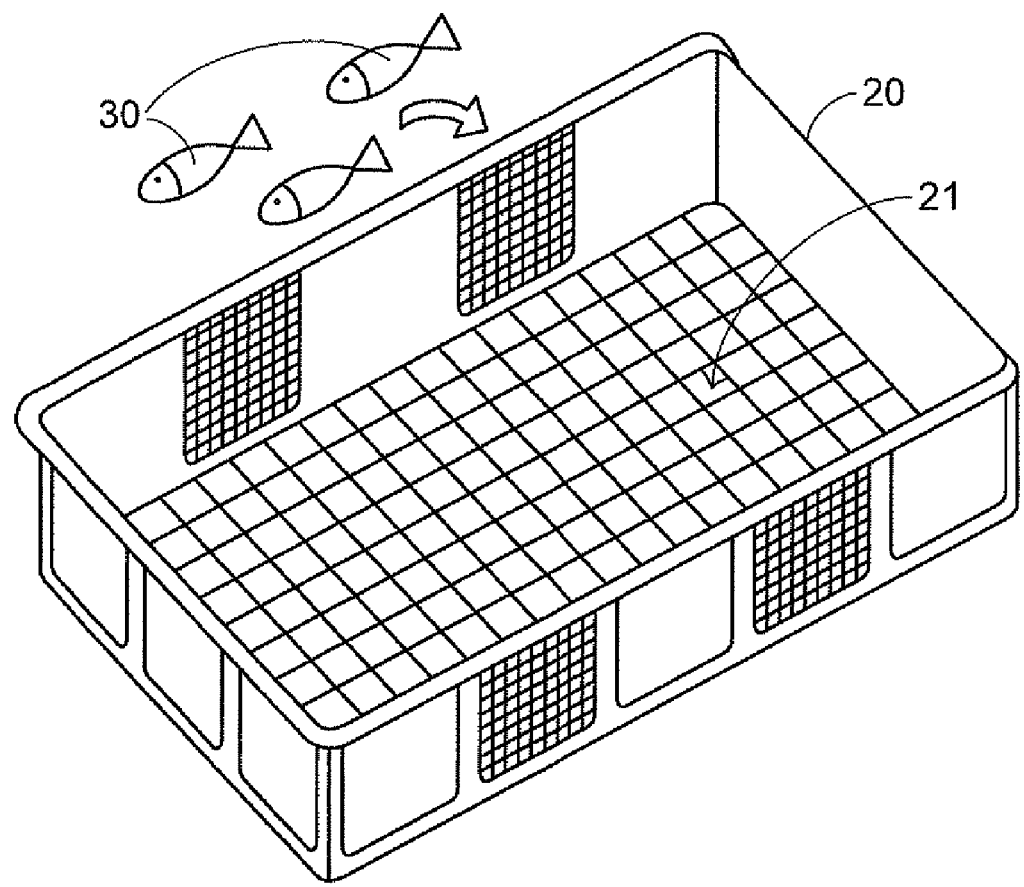
FIG. 1B is a schematic perspective view illustrating a creature container used in the automatic apparatus shown in FIG. 1A.

FIG. 1B is a schematic perspective view illustrating a creature container 20 used in the automatic apparatus 10 shown in FIG. 1A. Examples of the creatures are fishes 30. Each of the fishes 30 has many fish scales grown on various surfaces thereof. The fishes 30 are received in the creature container 20. Furthermore, the bottom or the side walls of the creature container 20 have at least a hollow-grid type rub structure 21 (e.g. a bulge or rough surface) for facilitating shedding the fish scales off the fishes 30 through the mutual friction. Due to the friction effect resulted from the rough surfaces of hollow-grid type rub structure 21, the fish scales of even one single fish 30 can be shed off during the creature container 20 is subject to the shaking operation (as will be described later).

Figure 2A:
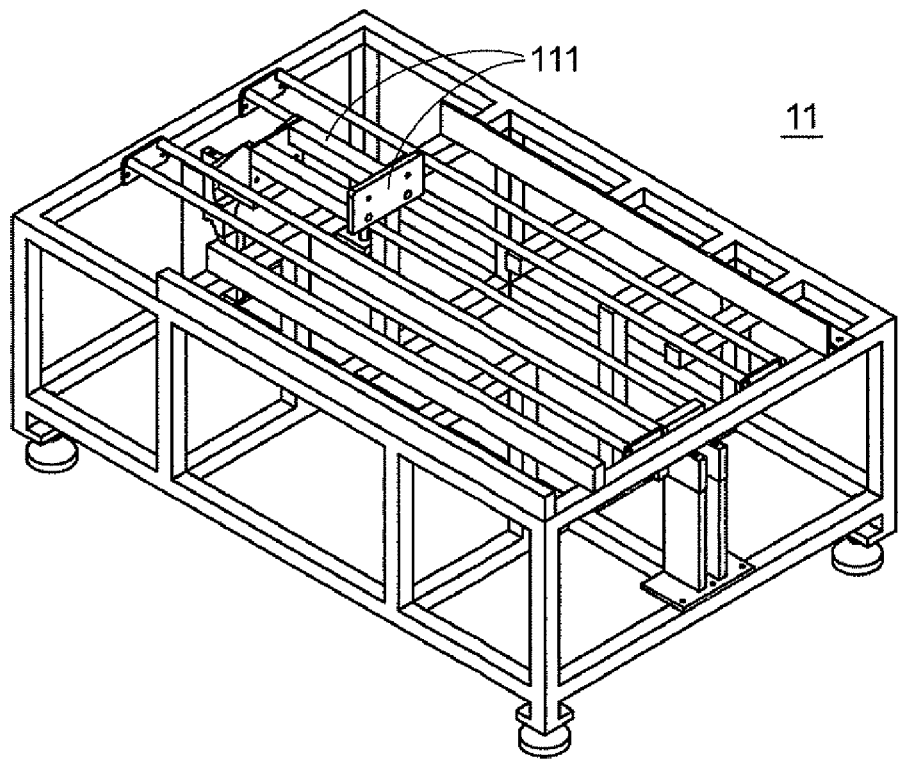
FIGS. 2A and 2B are schematic perspective views illustrating the input platform shown in FIG. 1 and taken from different viewpoints.
Figure 2B:
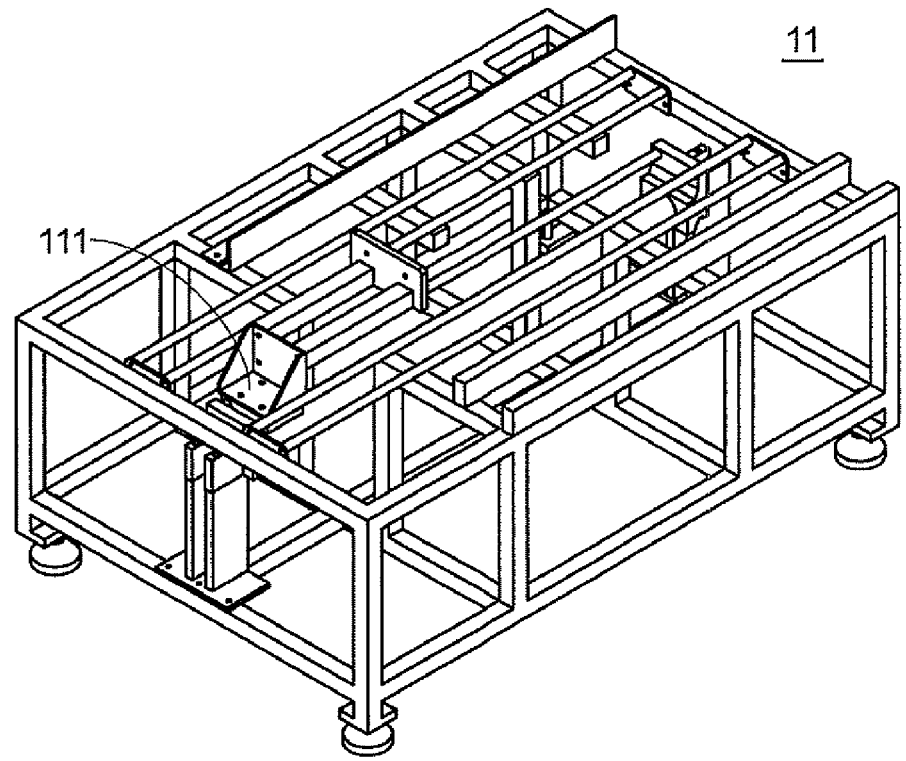
Figure 3A:
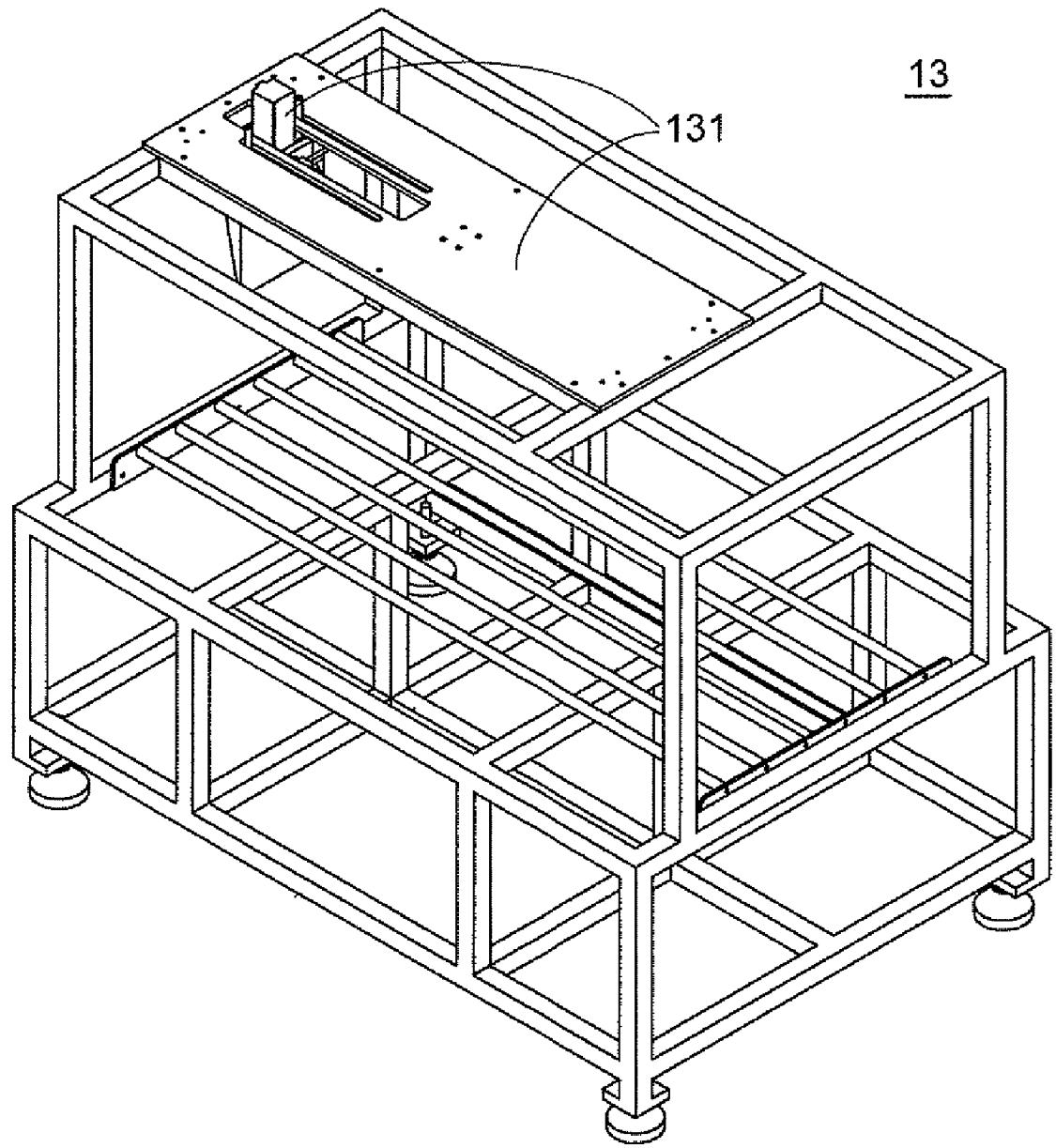
FIGS. 3A and 3B are schematic perspective views illustrating the output platform shown in FIG. 1 and taken from different viewpoints.
Figure 3B:
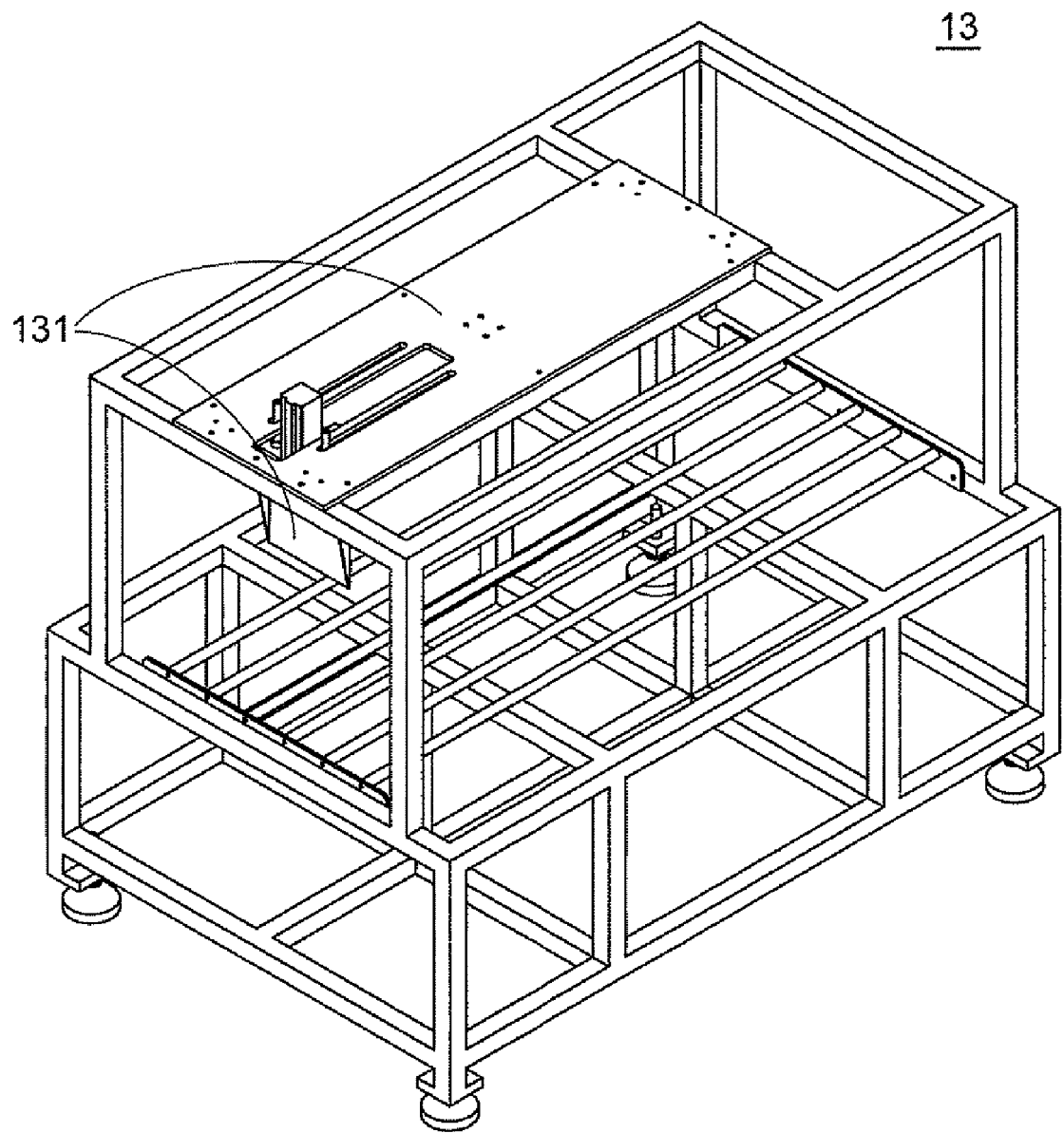
Figure 4A:
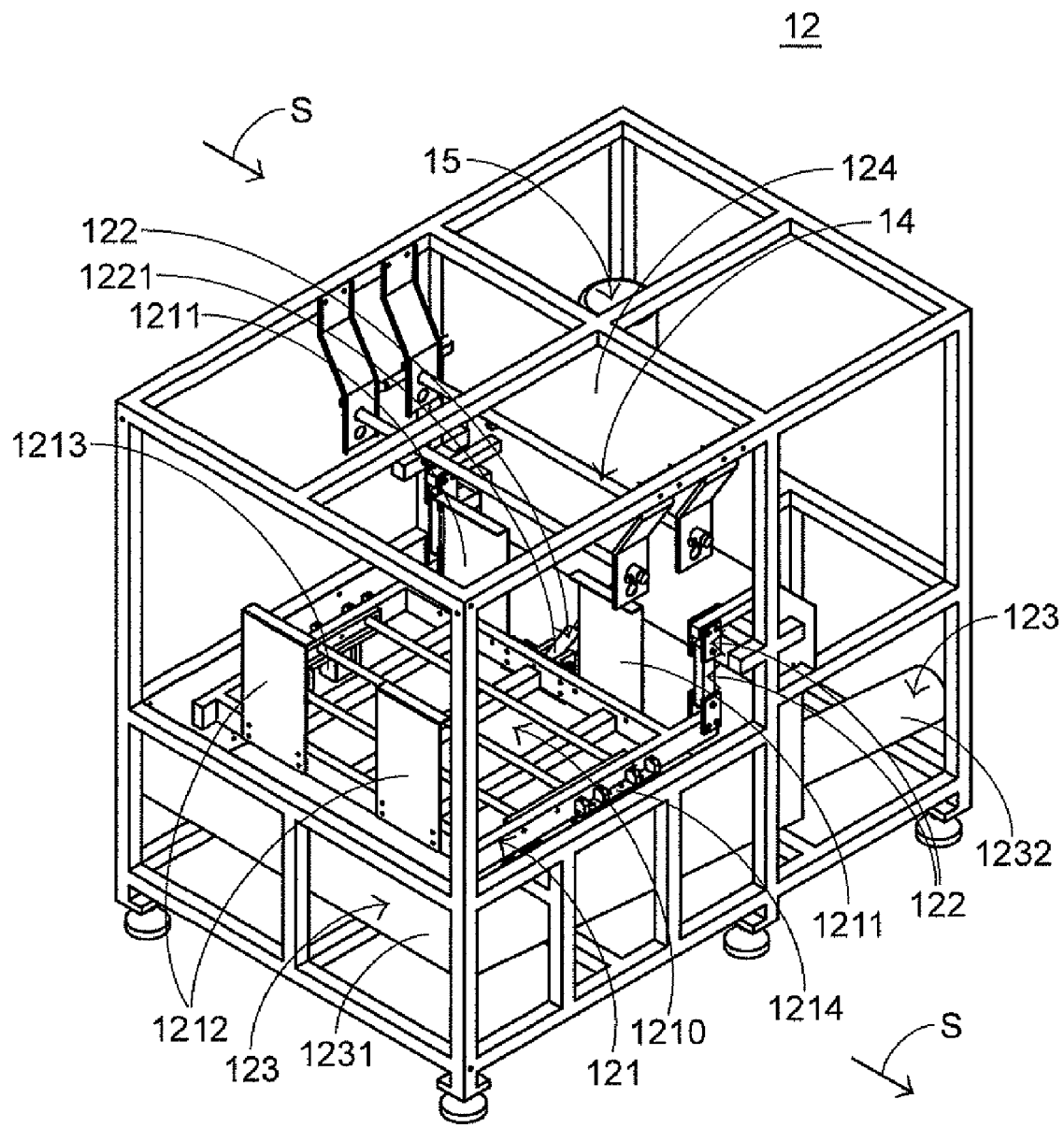
FIGS. 4A and 4B, which are schematic perspective views illustrating the internal components of the creature shaking mechanism shown in FIG. 1 and taken from different viewpoints.
Figure 4B:
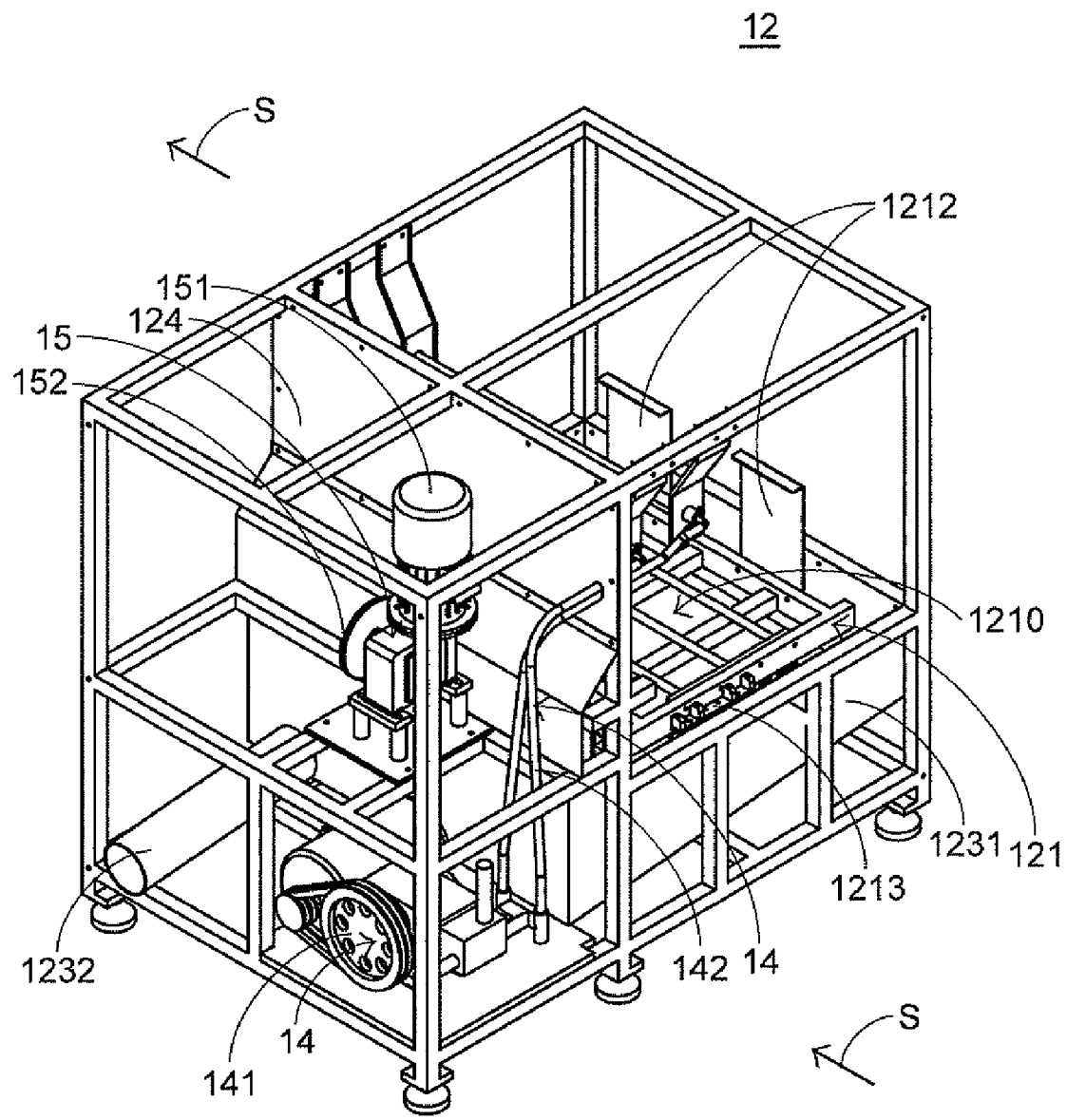

FIGS. 2A and 2B are schematic perspective views illustrating the input platform 11 shown in FIG. 1 and taken from different viewpoints. The input platform 11 is a stationary frame. The first transporting unit 111 includes a first electric push rod. The electric push rod is electrically connected to a power source 15 that is disposed in the creature shaking mechanism 12 (as shown in FIGS. 4A and 4B). FIGS. 3A and 3B are schematic perspective views illustrating the output platform 13 shown in FIG. 1 and taken from different view-points. The output platform 13 is a horizontal stationary frame. The second transporting unit 111 includes a second electric push rod, which is also electrically connected to the power source 15.

Hereinafter, the operations of the automatic apparatus 10 will be illustrated with reference to FIGS. 1, 2 and 3. First of all, the creature container 20 is manually placed on the input platform 11. Then, the creature container 20 is automatically pushed forwardly by the first electric push rod 111 to a positioning region 1210 of the creature shaking mechanism 12 (as shown in FIGS. 4A and 4B). Then, the creature container 20 is subject to a shaking operation and a flushing operation by the creature shaking mechanism 12. During the shaking operation and the flushing operation are performed, the fishes are turned over and rubbed against each other so as to facilitate shedding the fish scales off the fishes. Then, a next creature container 20 is manually placed on the input platform 11 and automatically pushed forwardly by the first electric push rod 111 to the creature shaking mechanism 12. When the previous creature container 20 is pushed by the next container 20, the previous container 20 begins to move from the positioning region 1210 toward the output platform 13. When the previous creature container 20 enters the output platform 13, one side of the previous creature container 20 is pulled by the second electric push rod 131 such that the previous creature container 20 is completely departed from the positioning region 1210.

According to the practical requirements and depending on the size of the input platform 11, two or more neighboring creature containers 20 can be simultaneously placed on the input platform 11.

Figure 4C:
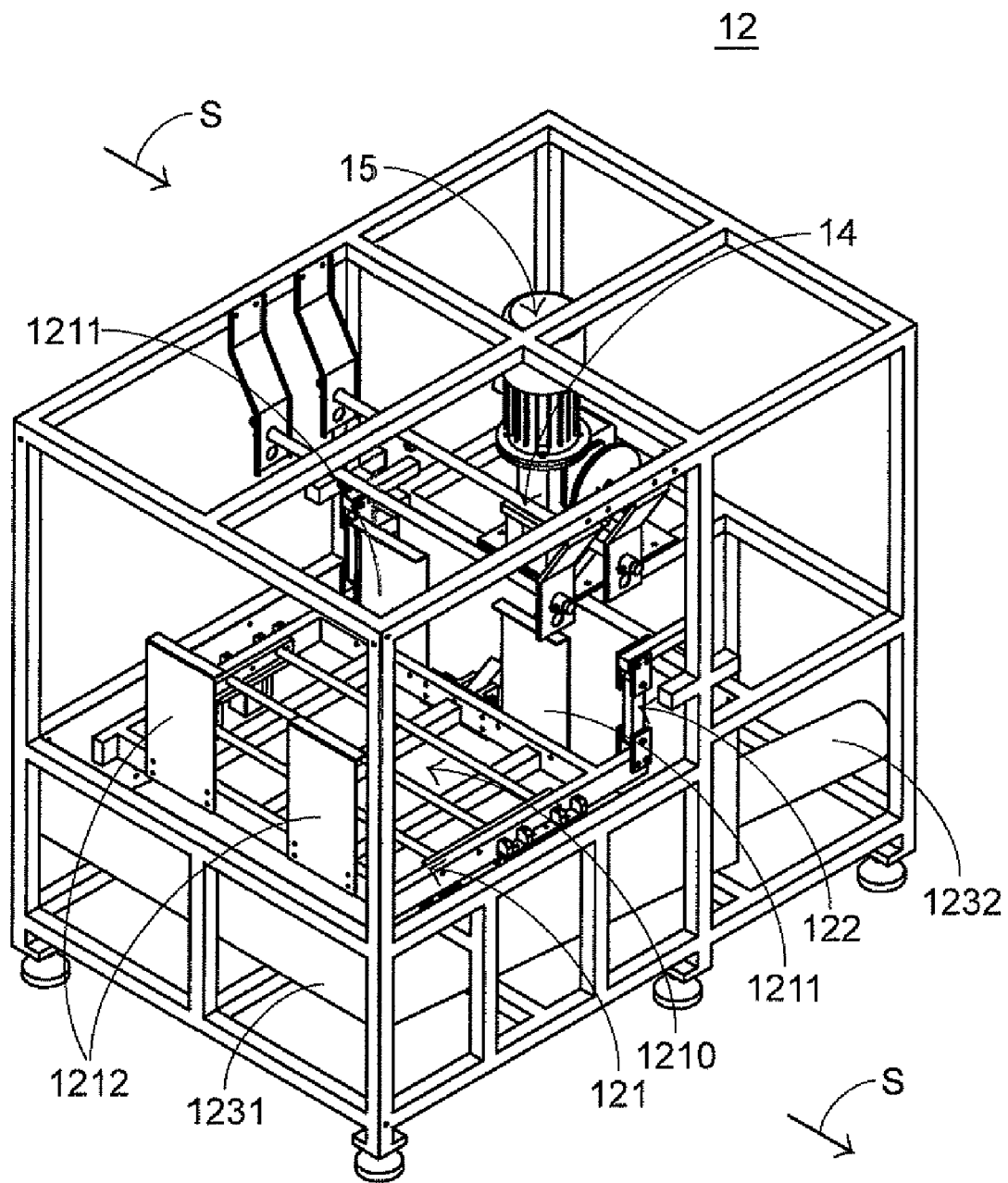
Figure 4D:
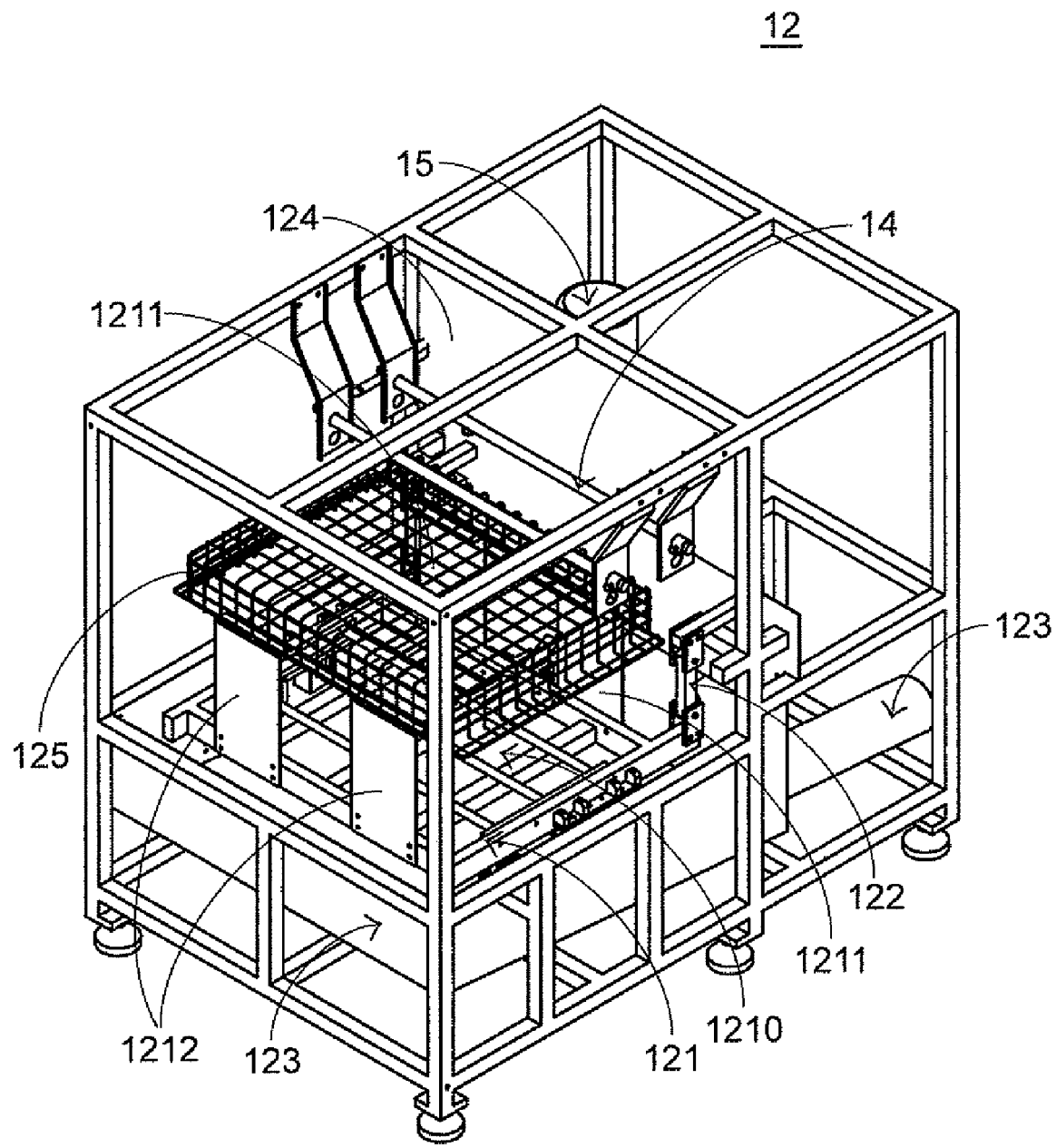
FIG. 4D is a schematic perspective view illustrating the internal components of the creature shaking mechanism comprising a wire cage.
Figure 5:
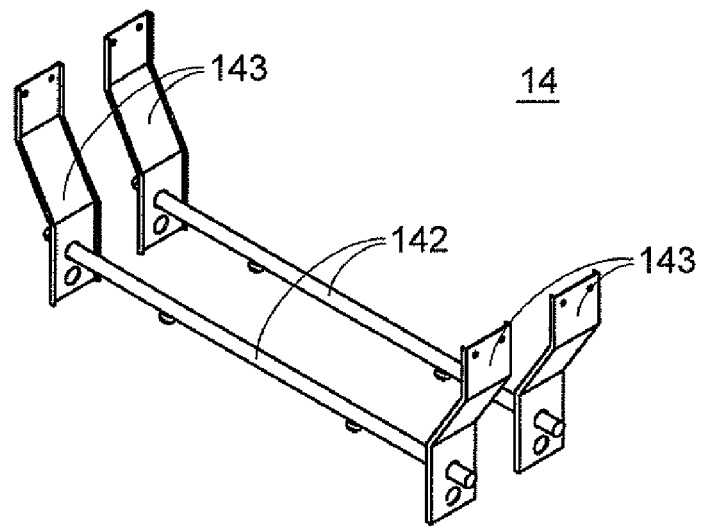
FIG. 5 is a schematic perspective view illustrating the flushing unit of the creature shaking mechanism.

The operations of the creature shaking mechanism 12 according to the first preferred embodiment of the present invention will be illustrated in more details with reference to FIGS. 4, 5 and 6.

FIGS. 4A and 4B are schematic perspective views illustrating the internal components of the creature shaking mechanism 12 shown in FIG. 1 and taken from different viewpoints. FIG. 4C is a schematic perspective view illustrating the internal components of the creature shaking mechanism 12 shown in FIG. 1, in which a water baffle 124 is dispensed with. In addition to the input platform 11, the creature shaking mechanism 12 and the output platform 13 mentioned above, the automatic apparatus 10 also comprises a flushing unit 14 and a power source 15. The power source 15 includes a driving motor 151 and a rotatable wobble disk 152. The rotatable wobble disk 152 is electrically connected with the driving motor 151.

Alternatively, said power source includes a pump and a pneumatic driving device connected with said pump (not shown), and said pneumatic driving device is pivotally coupled to a main pivot shaft of said pivot shafts.

The creature shaking mechanism 12 comprises an open frame 121 with a hollow-grid type structure 1210 and a shaking member 122. The shaking member 122 is electrically connected to the power source 15. The hollow-grid type structure 1210 is disposed at the middle of the open frame 121 and served as the positioning region 1210 for positioning the creature container 20. The creature container 20 is transported to the creature shaking mechanism 12 in a transporting direction S. In a direction parallel with the transporting direction S, two sets of stationary partition plates 1211 and 1212 are disposed on the left and right sides of the open frame 121. In a direction perpendicular to the transporting direction S, two sets of movable partition plates 1213 and 1214 are disposed on the front and rear sides of the open frame 121. The movable partition plates 1213 and 1214 can be uplifted or descended. In a case that the creature container 20 is subject to the shaking operation, the movable partition plates 1213 and 1214 are uplifted to confine the creature container 20, thereby preventing departure of the creature container 20 from the positioning region 1210.

The shaking member 122 includes several pivot shafts, several pivot slices and several pivot holes. These pivot shafts, pivot slices and pivot holes are connected between the power source 15 and the open frame 121. A main pivot shaft 1221 of these pivot shafts is pivotally coupled to the rotatable wobble disk 152 of the power source 15.

The shaking member 122 further includes an exhaust structure 123 and a water baffle 124. The exhaust structure 123 is disposed under the open frame 121. The water baffle 124 is arranged between the power source 15 and the positioning region 1210 for isolating the power source 15 from the positioning region 1210. The fish scales that are shed off of the fishes 30 and/or a spout of water that flushes the fishes 30 can be exhausted or collected by the exhaust structure 123. Since the power source 15 is isolated from the positioning region 1210 by the water baffle 124, the spout of water fails to render a short circuit of the power source 15 during the flushing operation is performed. In some embodiments, the exhaust structure 123 comprises a drain tank 1231 and a drain pipe 1232.

During the shaking operation is performed, the fishes 30 are turned over and rubbed against each other. For preventing detachment of the fishes 30 from the creature container 20 during the shaking operation is performed, the creature shaking mechanism 12 further comprises a wire cage 125 (as shown in FIG. 4D). The wire cage 125 is supported on the upper edges of the stationary partition plates 1211 and 1212.

Hereinafter, a process of using the creature shaking mechanism 12 to perform the flushing operation and the shaking operation will be illustrated in more details with reference to FIGS. 4, 5 and 6.

FIG. 5 is a schematic perspective view illustrating the flushing unit 14 of the creature shaking mechanism 12. The flushing unit 14 comprises a water source 140 (previously referring to FIG. 8 and FIG. 9), a pressurizing motor 141, several flushing pipes 142 and a flushing unit holder 143. A high-pressure spout of water W (previously referring to FIG. 8 and FIG. 9) generated by the pressurizing motor 141 flushes the fishes 30 in either a fixed direction or a non-fixed direction. The flushing pipes 142 are fixed on the flushing unit holder 143. By means of the flushing unit holder 143, the flushing unit 14 is fixed on the main body of the creature shaking mechanism 12.

Figure 6A:
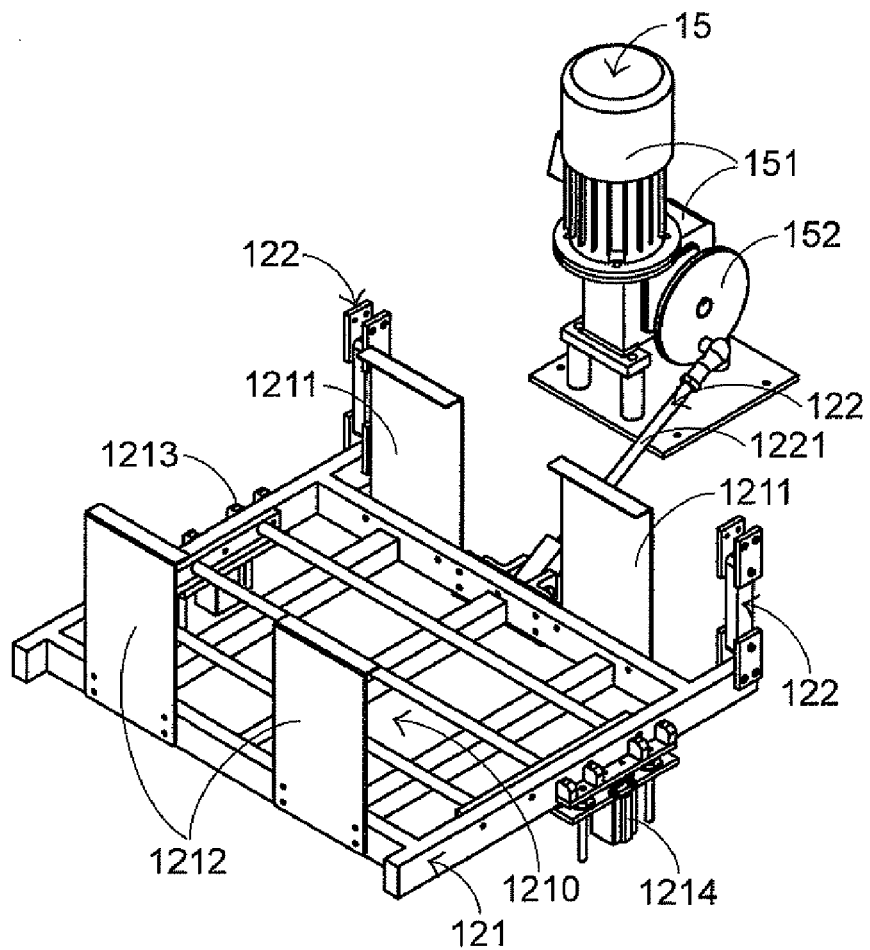
FIG. 6A is a schematic perspective view illustrating the connection between the power source, the open frame and the shaking member.
Figure 6B:
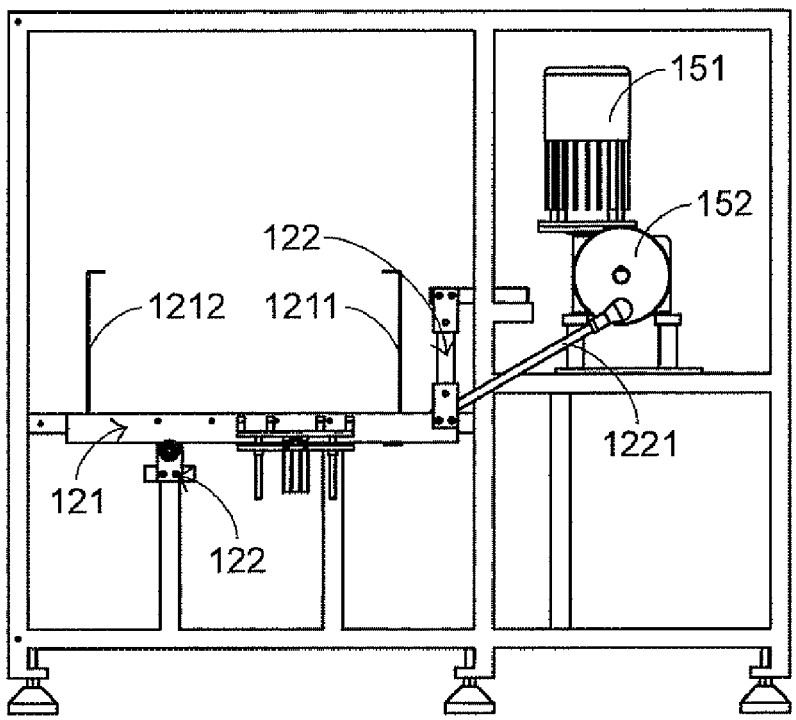
FIGS. 6B, 6C and 6D are schematic side views illustrating the shaking operation of the open frame that is driven by the shaking member in response to the power source.
Figure 6C:
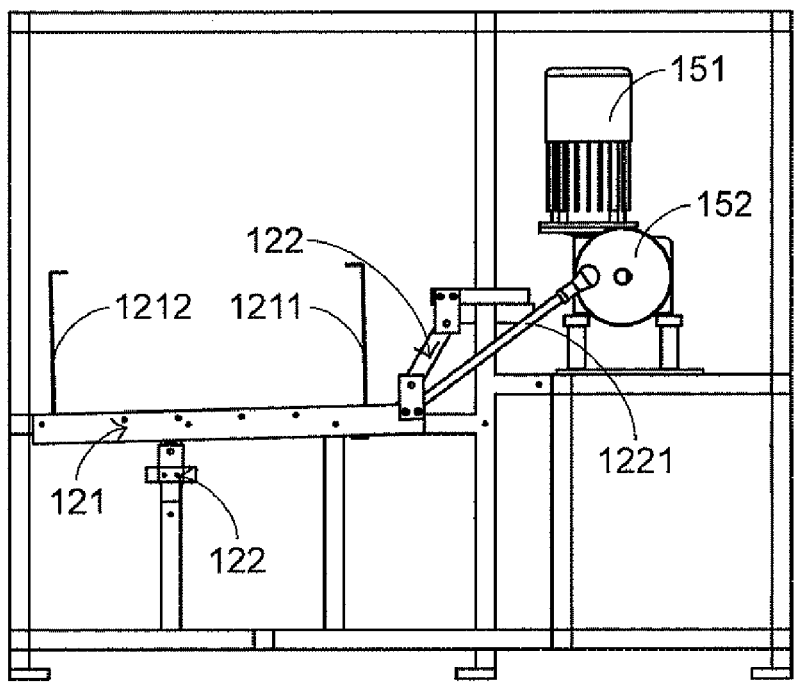
Figure 6D:
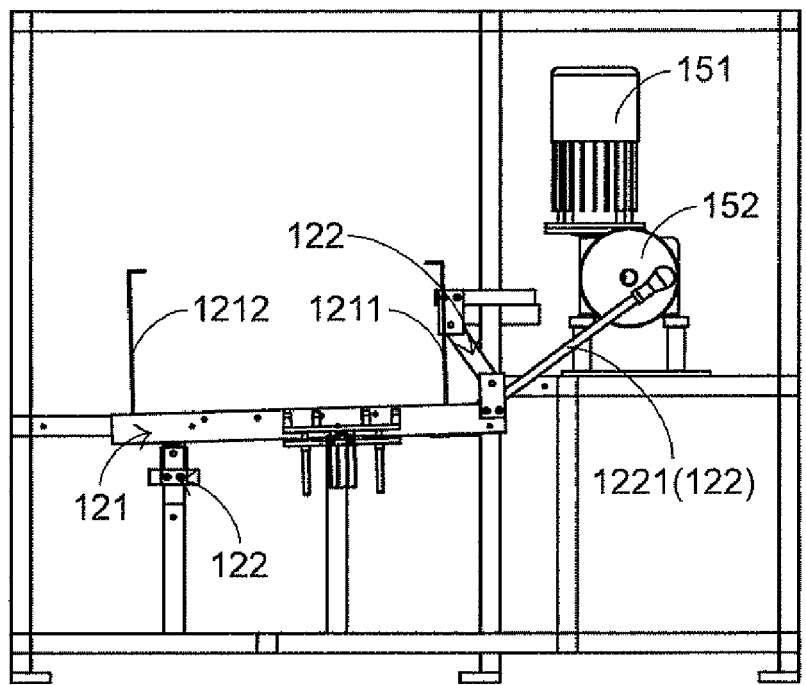

FIG. 6A is a schematic perspective view illustrating the connection between the power source 15, the open frame 121 and the shaking member 122. FIGS. 6B, 6C and 6D are schematic side views illustrating the shaking operation of the open frame 121 that is driven by the shaking member 122 in response to the power source 15.

The main pivot shaft 1221 of these pivot shafts is pivotally coupled to the rotatable wobble disk 152 of the power source 15. In a case that the rotatable wobble disk 152 is driven by the driving motor 152, the rotatable wobble disk 152 is rotated in a clock-wise direction to uplift one side of the open frame 121 and push forward the open frame 121 such that the open frame 121 is switched from a stationary status (as shown in FIG. 6B) to a forward shaking status (as shown in FIG. 6C). As the rotatable wobble disk 152 is continuously rotated in the clock-wise direction, the open frame 121 is descended and pulled back such that the open frame 121 is switched to a backward shaking status (as shown in FIG. 6D). The above procedures are repeated to perform the shaking operation. The shaking operation can turn over the fishes 30 and expose different surfaces of the fishes 30, thereby facilitating the spout of water to flush the different surfaces of the fishes 30.

In this embodiment, the shaking operation is illustrated by an upward/downward reciprocated vibrating action. It is noted that, however, those skilled in the art will readily observe that numerous modifications and alterations may be made while retaining the teachings of the invention. For example, the shaking operation may further comprise a forward/backward moving action, a leftward/rightward moving action, a turning-over action, a rotating action and a combination thereof.

The first electric push rod 111 of the input platform 11, the movable partition plates 1213 and 1214 of the creature shaking mechanism 12 and the second electric push rod 131 of the output platform 13 are driven and controlled by several solenoid valves (not shown) of the power source 15. The control mechanism of the solenoid valves is known in the art, and is not described herein.

Figure 7:
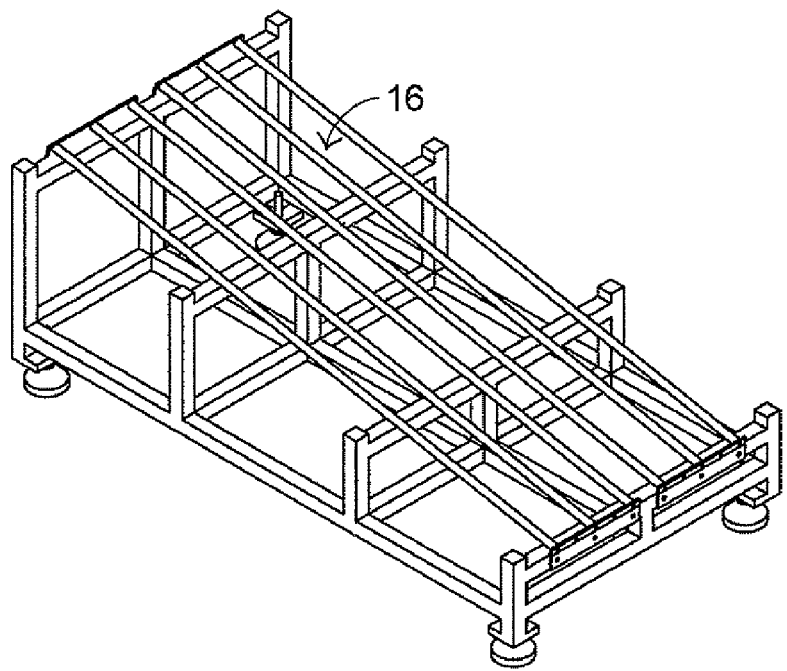
FIG. 7 is a schematic perspective view illustrating a variant of the output platform according to the present invention.

FIG. 7 is a schematic perspective view illustrating a variant of the output platform according to the present invention. In replace of the horizontal stationary frame 13 shown in FIGS. 3A and 3B, the output platform of FIG. 7 is an inclined stationary frame 16. The inclined stationary frame 16 has a slant surface. Once the creature container 20 is pushed forwardly and moved from the positioning region 1210 toward the output platform 13, the creature container 20 will slide along the slant surface such that the creature container 20 is completely departed from the positioning region 1210.

Figure 8:
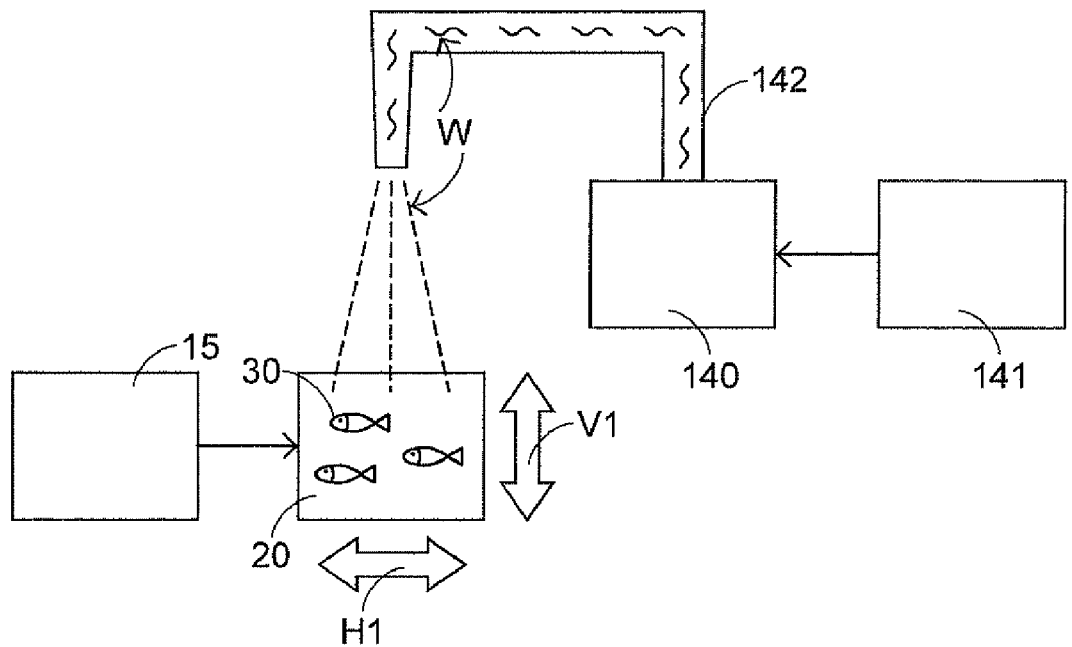
FIG. 8 is a schematic diagram illustrating an automatic apparatus for shedding superficial adherent substances off at least one creature when the creature container thereof is an open cavity according to a first preferred embodiment of the present invention.

FIG. 8 is a schematic diagram illustrating an automatic apparatus 10 for shedding superficial adherent substances 30 off at least one creature when the creature container 20 thereof is an open cavity according to a first preferred embodiment of the present invention. Further speaking, the creature container 20 placed on the positioning region 1210 can simultaneously contain multiple fishes 30 with fish scales to be shed. In response to the power source 15, the creature container 20 is subject to a shaking operation H1 and/or V1. Due to the shaking operation H1 and/or V1, the fishes 30 are turned over and rubbed against each other. The flushing unit 14 is disposed in one side of the creature container 12 for generating the high-pressure spout of water W to flush different locations of the fishes 30 and then shedding the fish scales off their surfaces. Besides, the creature container 20 may contain only one fish 30 with fish scales to be shed.

In FIG. 8, the flushing pipe 142 of the flushing unit 14 is disposed above the creature container 20 by way of the flushing unit holder 143 and the high-pressure spout of water W generated by the water source 140 and the pressurizing motor 141 flushes the fishes 30 in either a fixed direction or a non-fixed direction.

Figure 9:
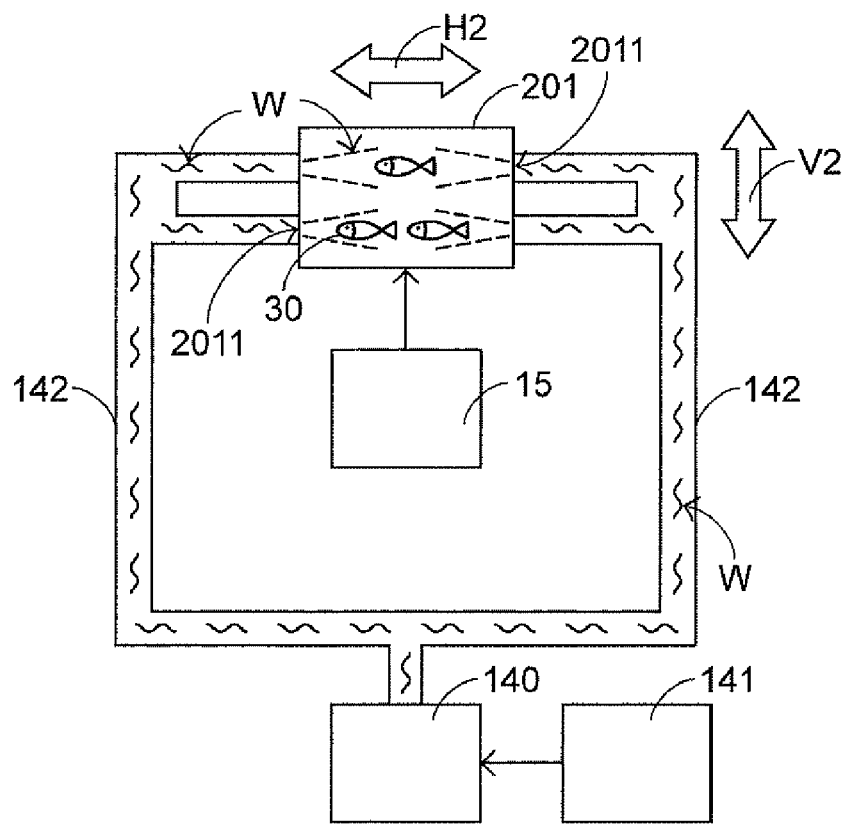
FIG. 9 is a schematic diagram illustrating an automatic apparatus for shedding superficial adherent substances off at least one creature when the creature container thereof is a closed cavity with a cover according to a first preferred embodiment of the present invention.

FIG. 9 is a schematic diagram illustrating an automatic apparatus 10 for shedding superficial adherent substances 30 off at least one creature when another creature container 201 thereof is a closed cavity with a cover according to a first preferred embodiment of the present invention. That is, the creature container 201 can simultaneously contain multiple fishes 30 with fish scales to be shed. In response to the power source 15, the creature container 201 is subject to a shaking operation H2 and/or V2. Due to the shaking operation H2 and/or V2, the fishes 30 are turned over and rubbed against each other. Besides, the creature container 201 may contain only one fish 30 with fish scales to be shed.

Differing from FIG. 8, the creature container 201 has many holes 2011 for the flushing pipes 142 to pierce through, and thus the high-pressure spout of water W may uniformly splash down the fishes 30 from the inside wall of the creature container 201.

In addition, the flushing unit 14 may be movably mounted on one side of the creature container 20 (and 201) in a reciprocated moving way.

The shaking operation H1(H2) and/or V1(V2) of the creature container 20 (and 201), as is described in the first preferred embodiment, includes one or more actions selected from an upward/downward reciprocated vibrating action, a forward/backward moving action, a leftward/rightward moving action, a turning-over action, a rotating action and a combination thereof. For example, the creature container 20 is subject to a leftward/rightward moving action of the shaking operation H1 in response to the lateral power source 15. Alternatively, the creature container 20 is subject to the leftward/rightward moving action H1 and an upward/downward reciprocated vibrating action V1 so as to sufficiently turn over the fishes 30.

Likewise, the shaking operation H2 and/or V2 of the creature container 201, as is described in the second preferred embodiment, includes one or more actions selected from an upward/downward reciprocated vibrating action, a forward/backward moving action, a leftward/rightward moving action, a turning-over action, a rotating action and a combination thereof. For example, the creature container 201 is subject to an upward/downward reciprocated vibrating action of the shaking operation V2 in response to the upward power source 15. Alternatively, the creature container 201 is subject to the upward/downward reciprocated vibrating action V2 and a leftward/rightward moving action H2 so as to sufficiently turn over the fishes 30.

In accordance with a key feature of the present invention, since multiple fishes 30 can be simultaneously contained in the creature containers 20 and 201, the shaking operation will turn over the fishes 30 and cause the fishes 30 to rub against each other. As a consequence, the speed of shedding the fish scales is enhanced. Moreover, in the assistance of the high-pressure spouts of water W, the fish scales at the margins (e.g. gills or ridges) of the fishes may be flushed clearly and rapidly.

Figure 10:
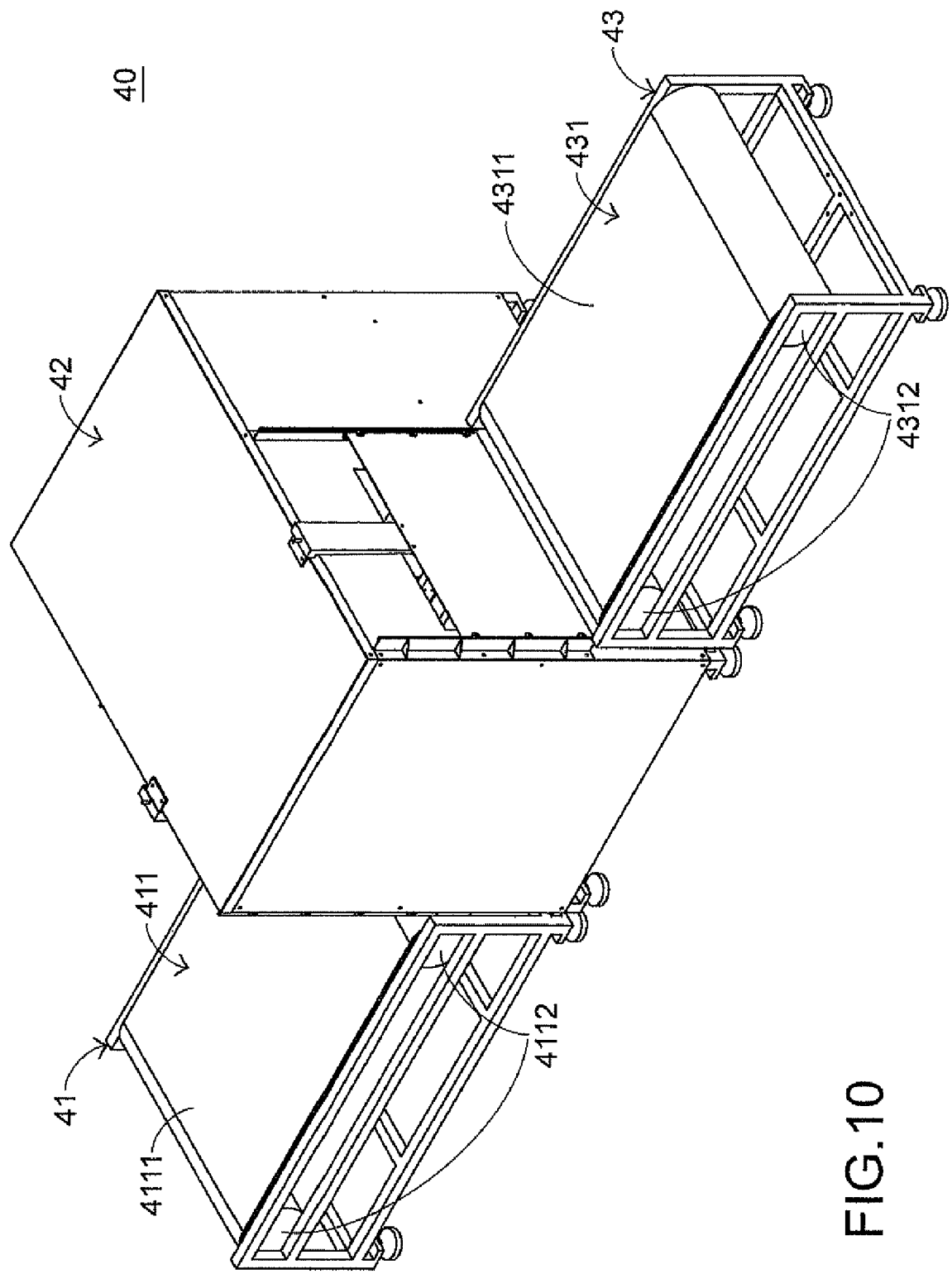
FIG. 10 is a schematic perspective view illustrating an automatic apparatus for shedding superficial adherent substances off at least one creature according to a second preferred embodiment of the present invention.

FIG. 10 is a schematic perspective view illustrating an automatic apparatus for shedding superficial adherent substances off at least one creature according to a second preferred embodiment of the present invention. As shown in FIG. 10, the automatic apparatus 40 principally comprises an input platform 41, a creature shaking mechanism 42 and an output platform 43. The input platform 41 a first transporting unit 411 and the output platform 43 has a second transporting unit 431. In this embodiment, the first transporting unit 411 is a belt-type roller assembly having a conveyor belt 4111 and a roller set 4112. Similarly, the second transporting unit 431 includes is another belt-type roller assembly having a conveyor belt 4311 and a roller set 4312.

Figure 11:
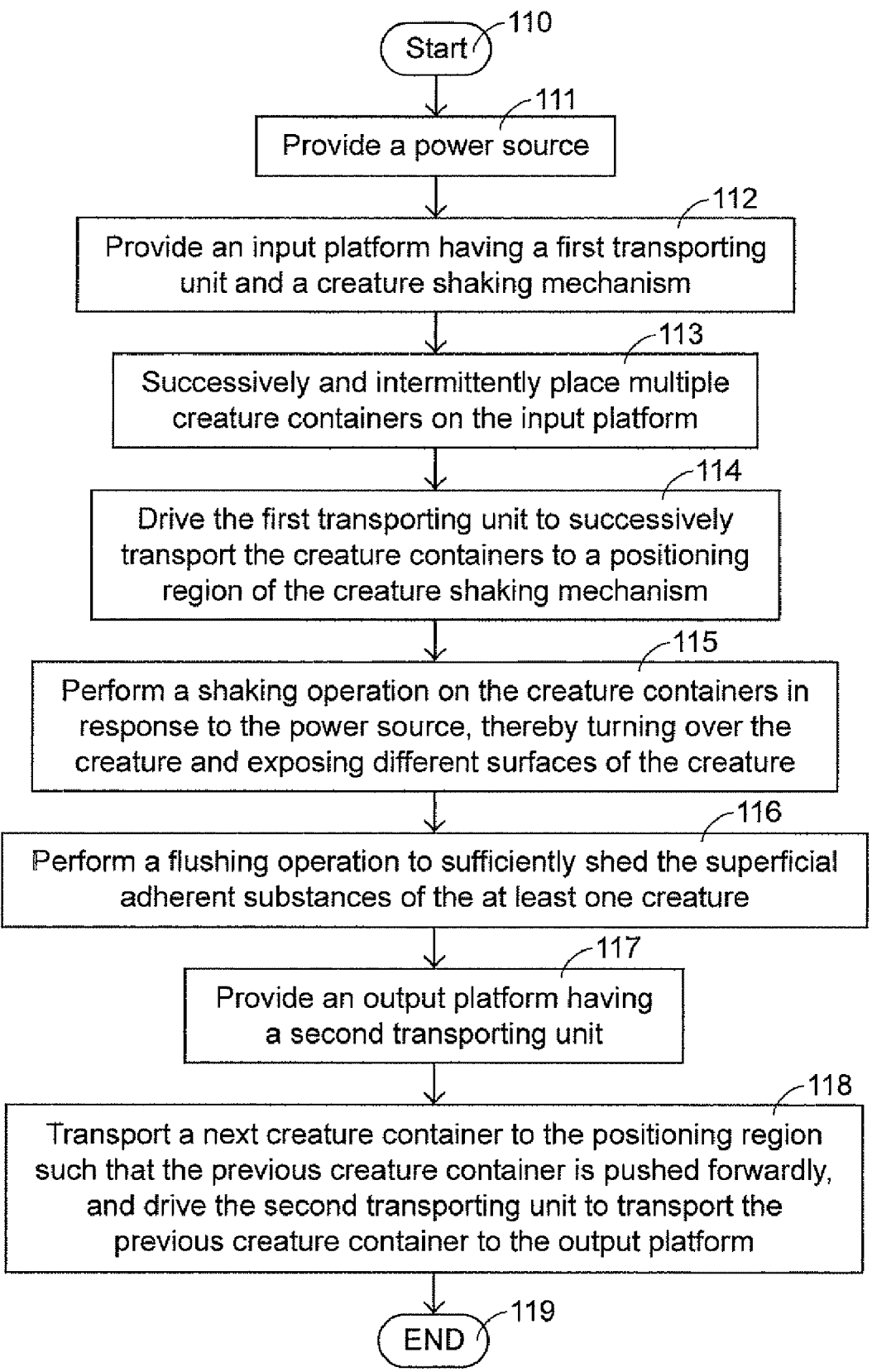
FIG. 11 is a flowchart illustrating an automatic process for shedding superficial adherent substances off at least one creature according to the present invention.

Hereinafter, an automatic process for shedding superficial adherent substances off at least one creature according to the present invention will be illustrated with reference to the flowchart of FIG. 11.

After the process is started (Step 110), a power source is provided (Step 111). Next, an input platform having a first transporting unit is provided, wherein the input platform is connected to an input end of a creature shaking mechanism and the first transporting unit is electrically connected to the power source (Step 112). Next, multiple creature containers are successively and intermittently placed on the input platform (Step 113). Next, the first transporting unit is driven to automatically and successively transport the creature containers to a positioning region of the creature shaking mechanism, wherein each of the creature containers contains the at least one creature having a plurality of superficial adherent substances thereon (Step 114). In response to the power source, a shaking operation is performed on the creature containers that are transported to the positioning region by the creature shaking mechanism, so that the at least one creature is turned over to expose different surfaces of the at least one creature (Step 115). Next, a flushing unit is provided at a side of the positioning region for performing a flushing operation to generate a spout of water to flush the different surfaces of the creature so as to sufficiently shed the superficial adherent substances of the at least one creature (Step 116). Next, an output platform having a second transporting unit is provided, wherein the output platform is connected to an output end of the creature shaking mechanism, and the second transporting unit is electrically connected to the power source (Step 117). Next a next creature container is transported to the positioning region by the first transporting unit to push forward a previous creature container that has been subject to the shaking operation and the flushing operation. Afterwards, the second transporting unit is driven to transport the previous creature container to be departed from the positioning region and completely moved to the output platform (Step 118). Until all creature containers have been subject to the shaking operations and the flushing operations, the process is terminated (Step 119).

From the above description, the creature container can be automatically transported by the input platform and the output platform of the automatic apparatus of the present invention. By means of the creature shaking mechanism, a shaking operation and a flushing operation are performed on the creatures to turn over the creatures and expose different surfaces of the creatures. As a result, the automatic apparatus and the automatic process of the present invention can effectively shed the superficial adherent substances off the creatures.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic apparatus for shedding superficial adherent substances off at least one creature, said automatic apparatus comprising:

an input platform having a transporting unit, wherein a creature container containing said at least one creature having a plurality of superficial adherent substances thereon is placed on said input platform, and said creature container is transported by said transporting unit;

a creature shaking mechanism having an input end connected to said input platform, wherein when said creature container is transported by said transporting unit to a positioning region of said creature shaking mechanism, and said creature container is subject to a shaking operation in response to a power source, thereby turning over said creature and exposing different surfaces of said at least one creature;

a flushing unit disposed at one side of said positioning region for performing a flushing operation on said creature container and generating a spout of water to flush said different surfaces of said at least one creature so as to sufficiently shed said superficial adherent substances off said at least one creature; and an output platform connected to an output end of the creature shaking mechanism for receiving said creature container that is departed from said positioning region.

2. The automatic apparatus according to claim 1 wherein said superficial adherent substances are grown on said surfaces of the creature.

3. The automatic apparatus according to claim 2 wherein said creature is a fish and said superficial adherent substances are fish scales.

4. The automatic apparatus according to claim 1 wherein said at least one creature contained in said creature container includes multiple creatures, wherein said creature container is subject to said shaking operation in response to said power source so as to turn over said multiple creatures and rub said multiple creatures against each other, thereby facilitating shedding said superficial adherent substances off said multiple creatures.

5. The automatic apparatus according to claim 1 wherein said input platform is a stationary frame, said transporting unit includes an electric push rod electrically connected to said power source, and one side of said creature container that is placed on said stationary frame is pushed forwardly by said electric push rod to said positioning region of said creature shaking mechanism.

6. The automatic apparatus according to claim 1 wherein said creature shaking mechanism comprises a hollow-grid type structure and a shaking member, said shaking member being electrically connected to said power source.

7. The automatic apparatus according to claim 6 wherein said positioning region is disposed at the middle of said open frame, and said creature shaking mechanism further comprises:

two sets of stationary partition plates disposed on left and right sides of said open frame and arranged in a direction parallel with a transporting direction of said creature container; and two sets of movable partition plates disposed on front and rear sides of said open frame, arranged in a direction perpendicular to said transporting direction of said creature container, and selectively uplifted or descended, wherein said movable partition plates are uplifted to confine said creature container and prevent departure of said creature container from said positioning region during said shaking operation is performed.

8. The automatic apparatus according to claim 7 wherein said creature shaking mechanism further comprises a wire cage, which is supported on upper edges of said stationary partition plates, for preventing detachment of said creature during said shaking operation of said creature container is performed.

9. The automatic apparatus according to claim 6 wherein said shaking member comprises several pivot shafts, several pivot slices and several pivot holes, which are arranged and connected between said power source and said open frame.

10. The automatic apparatus according to claim 9 wherein said power source comprises a driving motor and a rotatable wobble disk electrically connected with said driving motor, and said rotatable wobble disk is pivotally coupled to a main pivot shaft of said pivot shafts.

11. The automatic apparatus according to claim 9 wherein said power source comprises a pump and a pneumatic driving device connected with said pump, and said pneumatic driving device is pivotally coupled to a main pivot shaft of said pivot shafts.

12. The automatic apparatus according to claim 6 wherein said creature shaking mechanism further comprises:

an exhaust structure disposed under said open frame for collecting or exhausting said superficial adherent substances and/or said spout of water flushing said at least one creature during said flushing operation is performed; and a water baffle arranged between said power source and said positioning region for isolating said power source from said positioning region, so that a short circuit of said power source caused by said spout of water during said flushing operation is performed is avoided.

13. The automatic apparatus according to claim 12 wherein said exhaust structure comprises a drain tank and a drain pipe.

14. The automatic apparatus according to claim 1 wherein said flushing unit comprises a water source, a pressurizing motor and at least one flushing pipe, and said spout of water generated by the pressurizing motor is a high-pressure spout of water that flushes said at least one creature in either a fixed direction or a non-fixed direction.

15. The automatic apparatus according to claim 14 wherein said creature container is a closed cavity with a cover for preventing said at least one creature from dropping out of said creature container during said shaking operation; and alternatively said creature container is an open cavity.

16. The automatic apparatus according to claim 15 wherein said creature container has at least one hole for said at least one flushing pipe to pierce through when said creature container is a closed cavity with a cover; and alternatively said at least one flushing pipe is above said creature container when said creature container is an open cavity.

17. The automatic apparatus according to claim 1 wherein said shaking operation includes one or more actions selected from an upward/downward reciprocated vibrating action, a forward/backward moving action, a leftward/rightward moving action, a turning-over action, a rotating action and a combination thereof.

18. The automatic apparatus according to claim 1 wherein said output platform is a horizontal stationary frame and comprises an additional transporting unit, said transporting unit being electrically connected to said power source for completely departing said creature container from said positioning region.

19. The automatic apparatus according to claim 18 wherein said additional transporting unit includes an additional electric push rod electrically connected to said power source, and another side of said creature container is pulled by said additional electric push rod.

20. The automatic apparatus according to claim 18 wherein said power source comprises several solenoid valves for driving and controlling said transporting unit of said input platform, a movable partition plate of said creature shaking mechanism, and said additional transporting unit of said output platform.

21. The automatic apparatus according to claim 1 wherein said output platform is an inclined stationary frame having a slant surface, and said creature container slides along said slant surface such that said creature container is completely departed from said positioning region.

22. The automatic apparatus according to claim 1 wherein each of said transporting unit of said input platform and said additional transporting unit of said output platform comprises a belt-type roller assembly having a conveyor belt and a roller set.

23. An automatic process for shedding superficial adherent substances off at least one creature, said automatic process comprising steps of:

providing a power source;

providing an input platform having a first transporting unit, wherein said input platform is connected to an input end of a creature shaking mechanism, and said first transporting unit is electrically connected to the power source;

successively and intermittently placing multiple creature containers on said input platform;

driving said first transporting unit to automatically and successively transport said creature containers to a positioning region of said creature shaking mechanism, wherein each of said creature containers contains said at least one creature having a plurality of superficial adherent substances thereon;

performing a shaking operation on said creature containers that are transported to said positioning region by said creature shaking mechanism in response to said power source, so that said at least one creature is turned over to expose different surfaces of said at least one creature;

providing a flushing unit disposed at a side of said positioning region for performing a flushing operation to generate a spout of water to flush said different surfaces of said creature so as to sufficiently shed said superficial adherent substances of said at least one creature;

providing an output platform having a second transporting unit, wherein said output platform is connected to an output end of said creature shaking mechanism, and said second transporting unit is electrically connected to the power source; and transporting a next creature container to said positioning region by said first transporting unit to push forward a previous creature container that has been subject to said shaking operation and said flushing operation, and driving said second transporting unit to transport said previous creature container to be departed from said positioning region and completely moved to said output platform.

* * * * *